United States Patent
Coalter, III et al.

(10) Patent No.: US 7,365,039 B2
(45) Date of Patent: Apr. 29, 2008

(54) MORPHOLOGY CONTROLLED OLEFIN POLYMERIZATION PROCESS

(75) Inventors: Joseph N. Coalter, III, Hurricane, WV (US); Curt N. Theriault, Hemlock, MI (US); Jan W. Van Egmond, Charleston, WV (US); Roger B. Painter, Scott Depot, WV (US)

(73) Assignee: Dow Global Technologies Inc., Midland, MI (US)

(*) Notice: Subject to any disclaimer, the term of this patent is extended or adjusted under 35 U.S.C. 154(b) by 141 days.

(21) Appl. No.: 10/544,278

(22) PCT Filed: Feb. 20, 2004

(86) PCT No.: PCT/US2004/005018

§ 371 (c)(1),
(2), (4) Date: Aug. 3, 2005

(87) PCT Pub. No.: WO2004/094487

PCT Pub. Date: Nov. 4, 2004

(65) Prior Publication Data

US 2006/0142152 A1    Jun. 29, 2006

Related U.S. Application Data

(60) Provisional application No. 60/456,373, filed on Mar. 21, 2003.

(51) Int. Cl.
C08F 4/64    (2006.01)
C08F 4/642    (2006.01)

(52) U.S. Cl. .............. 502/167; 502/103; 502/127; 502/152; 526/161; 526/165; 526/172

(58) Field of Classification Search ............ 502/167, 502/103, 127, 152; 526/160, 161, 165, 172
See application file for complete search history.

(56) References Cited

U.S. PATENT DOCUMENTS

| | | |
|---|---|---|
| 3,082,198 A | 3/1963 | Klein |
| 3,919,185 A | 11/1975 | Takebe et al. |
| 3,995,097 A | 11/1976 | Brown et al. |
| 4,012,574 A | 3/1977 | Jones et al. |
| 4,532,311 A | 7/1985 | Fulks et al. |
| 4,792,592 A | 12/1988 | Fulks et al. |
| 4,803,251 A | 2/1989 | Goode et al. |
| 4,855,370 A | 8/1989 | Chirillo et al. |
| 4,876,320 A | 10/1989 | Fulks et al. |
| 5,026,795 A | 6/1991 | Hogan |
| 5,034,480 A | 7/1991 | Funk et al. |
| 5,034,481 A | 7/1991 | Funk et al. |
| 5,066,736 A | 11/1991 | Dumain et al. |
| 5,126,414 A | 6/1992 | Cooke et al. |
| 5,213,932 A * | 5/1993 | Shimazaki ............ 430/108.23 |
| 5,240,803 A * | 8/1993 | Ota ........................ 430/108.3 |
| 5,283,278 A | 2/1994 | Daire et al. |
| 5,332,706 A | 7/1994 | Nowlin et al. |
| 5,391,657 A | 2/1995 | Song et al. |
| 5,410,002 A | 4/1995 | Govoni et al. |
| 5,427,991 A | 6/1995 | Turner |
| 5,461,123 A | 10/1995 | Song et al. |
| 5,473,028 A | 12/1995 | Nowlin et al. |
| 5,492,975 A | 2/1996 | Peifer et al. |
| 5,610,244 A | 3/1997 | Govoni et al. |
| 5,627,243 A | 5/1997 | Hamalainen et al. |
| 5,643,847 A | 7/1997 | Walzer, Jr. |
| 5,661,095 A | 8/1997 | Meverden et al. |
| 6,653,417 B2 * | 11/2003 | Peterson .................... 526/172 |
| 6,953,764 B2 * | 10/2005 | Frazier et al. ............. 502/103 |

FOREIGN PATENT DOCUMENTS

| | | |
|---|---|---|
| EP | 0453116 A1 | 10/1991 |
| EP | 0549252 | 12/1992 |
| EP | 0811638 A2 | 6/1997 |
| WO | WO 96/08520 | 3/1996 |
| WO | WO 96/11961 | 4/1996 |
| WO | WO 97/06186 | 2/1997 |
| WO | WO 97/14721 | 4/1997 |
| WO | WO 97/15602 | 5/1997 |
| WO | WO 97/27224 | 7/1997 |
| WO | WO 97/46599 | 12/1997 |

* cited by examiner

Primary Examiner—Caixia Lu

(57) ABSTRACT

A catalyst composition, method of formation and process of use in the polymerization of olefin monomers, said composition comprising a catalyst compound, an activator capable of converting said catalyst compound into an active catalyst for addition polymerization, optionally a carrier, further optionally a liquid diluent, and a hydroxycarboxylate metal salt additive.

3 Claims, No Drawings

MORPHOLOGY CONTROLLED OLEFIN POLYMERIZATION PROCESS

CROSS REFERENCE STATEMENT

This application claims the benefit of U.S. Provisional Application No. 60/456,373, filed Mar. 21, 2003.

BACKGROUND OF THE INVENTION

This invention relates to a catalyst composition and methods for preparing the catalyst composition and for its use in a process for polymerizing olefins. In particular, the invention is directed to a catalyst composition and method of use, wherein the composition comprises a metal compound or complex that is activated to cause polymerization of addition polymerizable monomers by means of a cocatalyst or activating technique and a quantity of a hydroxycarboxylate metal salt sufficient to provide morphology control in the polymerization.

Advances in polymerization and catalysis have resulted in the capability to produce many new polymers having improved physical and chemical properties useful in a wide variety of superior products and applications. With the development of new catalysts the choice of polymerization-type (solution, slurry, high pressure or gas phase) for producing a particular polymer has been greatly expanded. Also, advances in polymerization technology have provided more efficient, highly productive and economically enhanced processes. Regardless of these technological advances in the polyolefin industry, common problems, as well as new challenges associated with process operability still exist. For example, the tendency for a gas phase or slurry phase process to foul and/or sheet remains a challenge.

For example, in a continuous slurry process fouling on the walls of the reactor, which act as a heat transfer surface, can result in many operability problems. Poor heat transfer during polymerization can result in polymer particles adhering to the walls of the reactor. These polymer articles can continue to polymerize on the walls and can result in a premature reactor shutdown. Also, depending on the reactor conditions, some of the polymer may dissolve in the reactor diluent and redeposit on for example the metal heat exchanger surfaces.

In a typical continuous gas phase process, a recycle system is employed for many reasons including the removal of heat generated in the process by the polymerization. Fouling, sheeting and/or static generation in a continuous gas phase process can lead to the ineffective operation of various reactor systems. For example, the cooling mechanism of the recycle system, the temperature probes utilized for process control and the distributor plate, if affected, can lead to an early reactor shutdown.

Evidence of, and solutions to, various process operability problems have been addressed by many in the art. For example, U.S. Pat. Nos. 4,792, 592, 4,803,251, 4,855,370 and 5,391,657 all discuss techniques for reducing static generation in a polymerization process by introducing to the process for example, water, alcohols, ketones, and/or inorganic chemical additives; PCT publication WO 97/14721 published Apr. 24, 1997 discusses the suppression of fines that can cause sheeting by adding an inert hydrocarbon to the reactor; U.S. Pat. No. 5,627,243 discusses a new type of distributor plate for use in fluidized bed gas phase reactors; PCT publication WO 96/08520 discusses avoiding the introduction of a scavenger into the reactor; U.S. Pat. No. 5,461,123 discusses using sound waves to reduce sheeting; U.S. Pat. No. 5,066,736 and EP-A1 0 549 252 discuss the introduction of an activity retarder to the reactor to reduce agglomerates; U.S. Pat. No. 5,610,244 relates to feeding make-up monomer directly into the reactor above the bed to avoid fouling and improve polymer quality; U.S. Pat. No. 5,126,414 discusses including an oligomer removal system for reducing distributor plate fouling and providing for polymers free of gels; EP-A1 0 453 116 published Oct. 23, 1991 discusses the introduction of antistatic agents to the reactor for reducing the amount of sheets and agglomerates; U.S. Pat. No. 4,012,574 discusses adding a surface-active compound, a perfluorocarbon group, to the reactor to reduce fouling; U.S. Pat. No. 5,026,795 discusses the addition of an antistatic agent with a liquid carrier to the polymerization zone in the reactor; U.S. Pat. No. 5,410,002 discusses using a conventional Ziegler-Natta titanium/magnesium supported catalyst composition where a selection of antistatic agents are added directly to the reactor to reduce fouling; U.S. Pat. Nos. 5,034,480 and 5,034,481 discuss a reaction product of a conventional Ziegler-Natta titanium catalyst with an antistat to produce ultrahigh molecular weight ethylene polymers; U.S. Pat. No. 3,082,198 discusses introducing an amount of a carboxylic acid dependent on the quantity of water in a process for polymerizing ethylene using a titanium/aluminum organometallic catalysts in a hydrocarbon liquid medium; and U.S. Pat. No. 3,919,185 describes a slurry process using a nonpolar hydrocarbon diluent using a conventional Ziegler-Natta-type or Phillips-type catalyst and a polyvalent metal salt of an organic acid having a molecular weight of at least 300.

There are various other known methods for improving operability including coating the polymerization equipment, for example, treating the walls of a reactor using chromium compounds as described in U.S. Pat. Nos. 4,532,311 and 4,876,320; injecting various agents into the process, for example PCT Publication WO 97/46599 published Dec. 11, 1997 discusses feeding into a lean zone in a polymerization reactor an unsupported, soluble metallocene-type catalyst composition and injecting antifoulants or antistatic agents into the reactor; controlling the polymerization rate, particularly on start-up; and reconfiguring the reactor design.

Others in the art to improve process operability have discussed modifying the catalyst composition by preparing the catalyst or components thereof in different ways. For example, methods in the art include combining the catalyst components in a particular order; manipulating the ratio of the various catalyst components; varying the contact time and/or temperature when combining the components; or simply adding various compounds to the catalyst composition. Especially illustrative in the art is the preparation procedures and methods for producing supported catalyst compositions with reduced tendencies for fouling and better operability. Examples of these include: WO 96/11961 published Apr. 26, 1996 discusses as a component of a supported catalyst composition an antistatic agent for reducing fouling and sheeting in a gas, slurry or liquid pool polymerization process; U.S. Pat. No. 5,283,278 is directed towards the prepolymerization of a metallocene catalyst or a conventional Ziegler-Natta catalyst in the presence of an antistatic agent; U.S. Pat. Nos. 5,332,706 and 5,473,028 have resorted to a particular technique for forming a catalyst by incipient impregnation; U.S. Pat. Nos. 5,427,991 and 5,643,847 describe the chemical bonding of non-coordinating anionic activators to supports; U.S. Pat. No. 5,492,975 discusses polymer bound metallocene-type catalyst compositions; U.S. Pat. No. 5,661,095 discusses supporting a metallocene-type catalyst on a copolymer of an olefin and an unsaturated silane; PCT publication WO 97/06186 published Feb. 20, 1997 teaches removing inorganic and organic impurities after formation of the metallocene-type catalyst itself; PCT publication WO 97/15602 published May 1, 1997 discusses readily supportable metal complexes; PCT publication WO 97/27224 published Jul. 31, 1997 relates to forming a supported transition metal compound in the presence of an unsaturated organic compound having at least one terminal double bond; and EP-A2-811 63,8 discusses using a metallocene catalyst and an activating cocatalyst in a polymerization process in the presence of a nitrogen containing antistatic agent.

While all these possible solutions might reduce the level of fouling or sheeting somewhat, some are expensive to employ and/or may not reduce fouling and sheeting to a level sufficient to successfully operate a continuous process, particularly a commercial or large-scale process.

Thus, it would be advantageous to have a polymerization process capable of operating continuously with enhanced reactor operability and at the same time produce new and improved polymers. It would also be highly beneficial to have a continuously operating polymerization process having more stable catalyst productivities, reduced fouling/sheeting tendencies and increased duration of operation.

SUMMARY OF THE INVENTION

According to the present invention there is provided a catalyst composition comprising a catalyst compound, an activator capable of converting said catalyst compound into an active catalyst for addition polymerization, a hydroxycarboxylate metal salt additive, optionally a carrier, and further optionally a liquid diluent.

In addition the present invention provides a polymerizing process, especially an olefin polymerization process, wherein one or more addition polymerizable monomers are polymerized in the presence of the foregoing catalyst composition to form a high molecular weight polymer. Preferred polymerization processes are gas phase and slurry polymerizations, most preferably a gas phase polymerization process, wherein an olefin monomer is polymerized.

The invention also provides for a method of making a catalyst composition useful for the polymerization of olefin(s), comprising combining, contacting, blending and/or mixing a polymerization catalyst with at least one hydroxycarboxylate metal salt. Suitable polymerization catalysts include conventional Ziegler-Natta-type transition metal polymerization catalysts as well as π-bonded transition metal compounds such as metallocene-type catalysts, and most preferably a supported polymerization catalyst.

In a preferred method for making the catalyst composition of the invention, one or more catalyst compounds, one or more activators, and optionally one or more supports or carriers are combined to form a supported catalyst, and thereafter, this composition is further contacted with a hydroxycarboxylate metal salt or solution thereof to form the catalyst composition of the invention. In a most preferred embodiment, the supported catalyst components and the hydroxycarboxylate metal salt are dry or substantially dried of liquid diluent prior to use.

In the most preferred method of the invention, the hydroxycarboxylate metal salt or a solution thereof, is added to a supported catalyst composition, or the individual components thereof, optionally with other additives. The resulting composition or a mixture thereof with a diluent may be filtered and/or dried to remove diluent prior to use, if desired.

DETAILED DESCRIPTION OF INVENTION

All reference to the Periodic Table of the Elements herein shall refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering groups. For purposes of United States patent practice, the contents of any patent, patent application or publication referenced herein is hereby incorporated by reference in its entirety, especially with respect to the disclosure of analytical or synthetic techniques and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "polymer", as used herein, includes both homopolymers, that is, polymers prepared from a single reactive compound, and copolymers, that is, polymers prepared by reaction of at least two polymer forming reactive, monomeric compounds. The term "crystalline" refers to a polymer that exhibits an X-ray diffraction pattern at 25° C. and possesses a first order transition or crystalline melting point (Tm). The term may be used interchangeably with the term "semicrystalline".

The invention is directed toward a method for making a catalyst composition and to the catalyst composition itself. The invention also relates to a polymerization process having improved operability and product capabilities using the catalyst composition. It has been surprisingly discovered that using a hydroxycarboxylate metal salt in an addition polymerization catalyst composition results in a substantially improved polymerization process.

Utilizing the present polymerization catalysts results in a substantial improvement in process operability, a significant reduction in sheeting and fouling of the reactor, especially a gas phase reactor, improved catalyst performance, better polymer particle morphology with no adverse effect on the polymer physical properties, and the capability to produce a broader range of polymers in a given reactor configuration.

Catalyst Components and Compositions

All polymerization catalysts including conventional-type transition metal catalysts are suitable for use in the polymerizing process of the invention. However, processes using π-bonded, metallocene-type catalysts are particularly preferred. The following is a non-limiting discussion of the various polymerization catalysts useful in the invention.
Conventional-Type Transition Metal Catalysts Conventional-type transition metal catalysts are those traditional Ziegler-Natta catalysts and Phillips-type chromium catalyst well known in the art. Examples of conventional-type transition metal catalysts are discussed in U.S. Pat. Nos. 4,115,639, 4,077,904 4,482,687, 4,564,605, 4,721, 763, 4,879,359 and 4,960,741. The conventional-type transition metal catalyst compounds that may be used in the present invention include transition metal compounds from Groups 3 to 8, preferably Group 4, of the Periodic Table of Elements.

These conventional-type transition metal catalysts may be represented by the formula: $M^a R^c_r$, where $M^a$ is a metal from Groups 3 to 8, preferably Group 4, more preferably titanium; $R^c$ is a halogen or a hydrocarbyloxy group; and r is the valence of the metal $M^a$. Non-limiting examples of $R^c$ include alkoxy, phenoxy, bromide, chloride and fluoride. Non-limiting examples of conventional-type transition metal catalysts where $M^a$ is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$.

Conventional-type transition metal catalyst compounds based on magnesium/titanium complexes that are useful in the invention are described in, for example, U.S. Pat. Nos. 4,302,565 and 4,302,566. The $MgTiCl_6$ (ethyl acetate)$_4$ derivative is particularly preferred. British Patent Application 2,105,355, describes various conventional-type vanadium catalyst compounds. Examples are compounds corresponding to the formulas: $VOX^a_3$, $VX^a_4$ and $VOX^a_2(OR)$ where $X^a$ is halo and R is hydrogen or hydrocarbyl, preferably a $C_{1-10}$ aliphatic or aromatic hydrocarbyl such as ethyl, phenyl, isopropyl, butyl, propyl, n-butyl, iso-butyl, tertiary-butyl, hexyl, cyclohexyl, or naphthyl. Non-limiting examples of conventional-type vanadium catalyst compounds include vanadyl tribalide, alkoxy halides and alkoxides such as $VOCl_3$, $VOCl_2(OC_4H_9)$, and $VO(OC_2H_5)_3$; vanadium tetra-halide and vanadium alkoxy halides such as $VCl_4$ and $VCl_3(OC_4H_9)$; vanadium and vanadyl acetyl acetonates and chloroacetyl acetonates such as $V(AcAc)_3$ and $VOCl_2(AcAc)$ where (AcAc) is acetyl acetonate. The preferred conventional-type vanadium catalyst compounds are $VOCl_3$, $VCl_4$ and $VOCl_2(OR)$ where R is $C_{1-10}$ aliphatic or aromatic hydrocarbyl.

Conventional-type chromium catalyst compounds, often referred to as Phillips-type catalysts, suitable for use in the present invention include $CrO_3$, chromocene, silyl chromate, chromyl choride ($CrO_2Cl_2$), chromium-2-ethyl-hexanoate, and chromium acetylacetonate ($Cr(AcAc)_3$). Non-limiting examples are disclosed in U.S. Pat. Nos. 2,285,721, 3,242,099 and 3,231,550.

Still other conventional-type transition metal catalyst compounds suitable for use in the present invention are disclosed in U.S. Pat. Nos. 4,124,532, 4,302,565, 4,302,566 and 5,763,723 and EP-A-416815 and EP-A420436. The conventional-type transition metal catalysts of the invention may also have the general formula $M^c_t M^d X^a_{2t} Y^a_u E^a$, where $M^c$ is Mg, Mn and/or Ca; t is a number from 0.5 to 2; $M^d$ is a transition metal, preferably Ti, V and/or Zr; $X^a$ is a halogen, preferably Cl, Br or I; $Y^a$ may be the same or different and is halogen, alone or in combination with oxygen, —$NR^y_2$, —$OR^y$, —$SR^y$, —$COOR^y$, or —$OSOOR^y$, where $R^y$ is a hydrocarbyl radical, in particular an alkyl, aryl, cycloalkyl or arylalkyl radical, acetylacetonate anion in an amount that satisfies the valence state of $M^c$; u is a number from 0.5 to 20; $E^a$ is an electron donor compound selected from the following classes of compounds: (a) esters of organic carboxylic acids; (b) alcohols; (c) ethers; (d) amines; (e) esters of carbonic acid; (f) nitrites; (g) phosphoramides, (h) esters of phosphoric and phosphorus acid, and (j) phosphorus oxychloride. Non-limiting examples of complexes satisfying the above formula include:

$MgTiCl_5 \cdot 2CH_3COOC_2H_5$, $Mg_3Ti_2Cl_{12} \cdot 7CH_3COOC_2H_5$, $MgTiCl_5 \cdot 6C_2H_5OH$, $MgTiCl_5 \cdot CH_3OH$, $MgTiCl_5 \cdot (THF)$, $MgTi_2Cl_2 \cdot 7C_6H_5CN$, $Mg_3Ti_2Cl_{12} \cdot 6C_6H_5COOC_2H_5$, $MgTiCl_6 \cdot 2CH_3COOC_2H_5$, $MgTiCl_6 \cdot 6C_5H_5N$, $MgTiCl_5 (OCH_3) \cdot 2CH_3COOC_2H_5$, $MgTiCl_5N(C_6H_5)_2 \cdot 3CH_3COOC_2H_5$, $MgTiBr_2Cl_4 \cdot 2(C_2H_5)_2O$, $MnTiCl_5 \cdot 4C_2H_5OH$, $Mg_3V_2Cl_{12} \cdot 7CH_3COOC_2H_5$, $MgZrCl_6 \cdot 4(THF)$. Other catalysts may include cationic catalysts such as $AlCl_3$, and other cobalt and iron catalysts well known in the art.

Typically, these conventional-type transition metal catalyst compounds excluding some convention-type chromium catalyst compounds are activated with one or more of the conventional-type cocatalysts described below.

Conventional-Type Cocatalysts

Conventional-type cocatalyst compounds for the above conventional-type transition metal catalyst compounds may be represented by the formula $M^e M^f_v X^b_c R^z_{e+v-c}$, wherein $M^e$ is a metal from Groups 1, 2, 12 or 13 of the Periodic Table of Elements having a valency of e; $M^f$ is a metal of Group 1 of the Periodic Table of Elements; v is a number from 0 to 1; each $X^b$ is any halogen; c is a number from 0 to 3; and each $R^z$ is a monovalent hydrocarbon radical or hydrogen. Preferred conventional-type organometailic cocatalyst compounds for the above conventional-type transition metal catalysts have the formula $M^e R^z_e$, where $M^e$ is a metal of Groups 1, 2, 12, or 13 of the Periodic Table of the Elements, such as lithium, sodium, beryllium, barium, boron, aluminum, zinc, cadmium, or gallium; e equals 1, 2 or 3 depending upon the valency of $M^e$, and each $R^z$ is as previously defined, preferably $C_{1-4}$ alkyl.

Non-limiting examples of conventional-type organometallic cocatalyst compounds of Groups 1, 2 and 13 useful with the conventional-type catalyst compounds described above include methyllithium, butyllithium, dihexylmercury, butylmagnesium, diethylcadmium, benylpotassium, diethylzinc, tri-n-butylaluminum, diisobutyl ethylboron, diethylcadmium, di-n-butylzinc and tri-n-amylboron, and, in particular, aluminum trialkyl compounds, such as trihexylaluminum, triethylaluminum, trimethylaluminum, and tri-isobutylaluminum. Other conventional-type cocatalyst compounds include mono-organohalides and hydrides of Group 13 metals, and mono- or di-organohalides and hydrides of Group 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, dibromoaluminum hydride and bromocadmium hydride. Conventional-type organometallic cocatalyst compounds are known to those in the art and a more complete discussion of these compounds may be found in U.S. Pat. Nos. 3,221,002 and 5,093,415.

Metallocene Catalyst Compounds

Generally, metallocene catalyst compounds include half and fulll sandwich compounds having one or more π-bonded ligands including cyclopentadienyl-type structures or other similar functioning structure such as pentadiene, cyclooctatetraendiyl and imides. Typical compounds are generally described as containing one or more ligands capable of π-bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements. Exemplary of metallocene-type catalyst compounds are described in, for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384, 299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753, 577, 5,767,209, 5,770,753 and 5,770,664; European publications: EP-A-0 591 756, EP-A-0 520 732, EP-A-0 420 436, EP-A-0 485 822, EP-A-0 485 823, EP-A-0 743 324, EP-A-0 518 092; and PCT publications: WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144.

In one embodiment, catalyst compounds used in the present invention are represented by the formula:

$$L^a L^b MQ_n \qquad (I)$$

where M is a metal of groups 3-8 of the Periodic Table of the Elements or the lanthanides or actinides, preferably a Group 4, 5 or 6 transition metal, more preferably a metal from Group 4, that is, zirconium, hafnium or titanium. $L^a$ and $L^b$ are ligands that include a cyclopentadienyl or substituted cyclopentadienyl group or a heteroatom substituted derivative thereof, or inertly substituted or partially hydrogenated derivatives of the foregoing. Examples include indenyl ligands, benzindenyl ligands, fluorenyl ligands, octahydrofluorenyl ligands, cyclooctatetraendiyl ligands, azenyl ligands, borabenzene ligands, cyclopentaphenanthrenyl ligands, azuleneyl ligands, and indacenyl ligands, including partially hydrogenated versions thereof. Also, $L^a$ and $L^b$ may be any other ligand structure capable of π-bonding to M. For example $L^a$ and $L^b$ may comprises one or more heteroatoms, for example, nitrogen, silicon, boron, germanium, and phosphorous, in combination with carbon atoms to form a cyclic structure, for example a heterocyclopentadienyl ancillary ligand. Further, each of $L^a$ and $L^b$ may also be other types of ligands including but not limited to amides, phosphides, alkoxides, aryloxides, imides, carbolides, borollides, porphyrins, phthalocyanines, corrins and other polyazomacrocycles. Each $L^a$ and $L^b$ may be the same or different type of ligand that is π-bonded to M.

Each $L^a$ and $L^b$ may be substituted with one or more substituent groups, R. Non-limiting examples of substituent groups R include hydrogen or linear, branched, or cyclic alkyl, alkenyl, alkynl or aryl radicals or combination thereof having from 1 to 30 carbon atoms or other substituents having up to 50 non-hydrogen atoms that can also be substituted. Non-limiting examples of alkyl substituents R include methyl, ethyl, propyl, butyl, pentyl, hexyl, cyclopentyl, cyclohexyl, benzyl or phenyl groups, and halogens, including all their isomers, for example tertiary butyl, isopropyl, etc. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, and methyldiethylsilyl; and halocarbyl-substituted organometalloid radicals including tris(trifluoromethyl)-silyl, methyl-bis (difluoromethyl)silyl, and bromomethyldimethylgermyl; and disubstituted boron radicals including dimethylboron for example; and disubstituted pnictogen radicals including dinethylamine, diiethylphosphine, diphenylamine, methylphenylphosphine, chalcogen radicals including methoxy, ethoxy, propoxy, phenoxy, methylsulfide and ethylsulfide.

Non-hydrogen substituents R include the atoms carbon, silicon, nitrogen, phosphorous, oxygen, tin, and germanium including olefins such as but not limited to olefinically unsaturated substituents including vinyl-terminated ligands, for example but-3-enyl, 2-vinyl, or hexene-1. Also, at least two R groups, preferably two adjacent R groups are joined to form a ring structure having from 4 to 30 atoms selected from carbon, nitrogen, oxygen, phosphorous, silicon, germanium, boron or a combination thereof Also, an R group such as 1-butanyl may form a carbon sigma bond to the metal M.

Other ligands may be bonded to the transition metal, such as a leaving group Q. Q may be independently monoanionic labile ligands having a sigma-bond to M. Non-limiting examples of Q include weak bases such as amines, phosphines, ether, hydroxycarboxylates, dienes, hydrocarbyl radicals having from 1 to 20 carbon atoms, hydrides or halogens, and combinations thereof. Other examples of Q radicals include those substituents for R as described above and including cyclohexyl, heptyl, tolyl, trifluromethyl, tetramethylene and pentamethylene, methylidene, methyoxy, ethyoxy, propoxy, phenoxy, bis(N-methylanilide), dimethylamide, and dimethylphosphide radicals.

In addition, catalyst compounds of the invention are those where $L^a$ and $L^b$ are bridged to each other by a bridging group, $E^b$. These bridged compounds are known as bridged, catalyst compounds. Non-limiting examples of bridging group $E^b$ include bridging radicals of at least one Group 14 atom, such as but not limited to carbon, oxygen, nitrogen, silicon, germanium and tin, preferably carbon, silicon and germanium, most preferably silicon. Other non-limiting examples of bridging groups, $E^b$, include dimethylsilyl, diethylsilyl, methylethylsilyl, trifluoromethylbutylsilyl, bis (trifluoromethyl)silyl, di-n-butylsilyl, silylcyclobutyl, di-i-propylsilyl, di-cyclohexylsilyl, di-phenylsilyl, cyclohexylphenylsilyl, t-butylcyclohexylsilyl, di-t-butylphenylsilyl, di(p-tolyl)silyl, dimethylgermyl, diethylgermyl, methylene, dimethylmethylene, diphenylmethylene, ethylene, 1-2-dimethylethylene, 1,2-diphenylethylene, 1,1,2,2-tetramethylethylene, dimethylmethylenedimethylsilyl, methylenediphenylgermyl, methylamine, henylamine, cyclohexylamine, methylphosphine, phenylphosphine, and cyclohexylphosphine.

Other catalysts compounds useful in the invention include metal complexes corresponding to the formula:

$$L_j MX_p X'_q \qquad (II)$$

wherein: M is a metal of Group 4 of the Periodic Table of the Elements having an oxidation state of +2, +3 or +4, bound in an $\eta^5$ bonding mode to one or more L groups;

L independently each occurrence is a cyclopentadienyl-, indenyl-, tetrahydroindenyl-, fluorenyl-, tetrahydrofluorenyl-, or octahydrofluorenyl-group optionally substituted with from 1 to 8 substituents independently selected from the group consisting of hydrocarbyl, halo, halohydrocarbyl, aminohydrocarbyl, hydrocarbyloxy, dihydrocarbylamino, dihydrocarbylphosphino, silyl, aminosilyl, hydrocarbyloxysilyl, and halosilyl groups containing up to 20 non-hydrogen atoms, or further optionally two such L groups may be joined together by a divalent substituent selected from hydrocarbadiyl, halohydrocarbadiyl, hydrocarbyleneoxy, hydrocarbyleneamino, siladiyl, halosiladiyl, and divalent aminosilane, groups containing up to 20 non-hydrogen atoms;

X independently each occurrence is a monovalent or polyvalent anionic ligand group having one or more shared of donative bonds to $M^b$, and optionally one or more shared or donative bonds to one or more L groups, said X containing up to 60 nonhydrogen atoms;

X' independently each occurrence is a neutral Lewis base ligating compound, having up to 20 atoms;

j, p, and q are 0, 1 or 2.

The compositions of the present invention are believed to exist in the form of a mixture of one or more cationic, zwitterionic or other catalytically active species derived from the foregoing metal complex a) in combination with the activator compound, b), or alternatively, a mixture of the metal complex or a cationic, zwitterionic or other catalytically active derivative thereof with a derivative formed by interaction of compound c) with the cocatalyst or with the activated catalyst. Fully cationic or partially charge separated metal complexes, that is, zwitterionic metal complexes, have been previously disclosed in U.S. Pat. No. 5,470,993 and 5,486,632. Derivatives of the Group 13 compound and cocatalyst may arise, for example, by ligand exchange. In particular, where the cocatalyst is a strong Lewis acid, such as tris(fluorophenyl)borane, some quantity of fluorophenyl substituents may exchange with the ligand groups of the Group 13 compound to form fluorophenyl substituted derivatives thereof.

Preferred X' groups are phosphines, especially trimethylphosphine, triethylphosphine, triphenylphosphine and bis (1,2-dimethylphosphino)ethane; $P(OR)_3$, wherein R is as previously defined; ethers, especially tetrahydrofuran; amines, especially pyridine, bipyridine, tetramethylethylenediamine (TMEDA), and triethylamine; olefins; and conjugated dienes having from 4 to 40 carbon atoms. Complexes including conjugated diene X' groups include those wherein the metal is in the +2 formal oxidation state.

Preferred examples of coordination complexes used according to the present invention include the foregoing species:

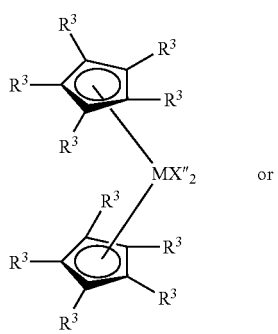

(III)

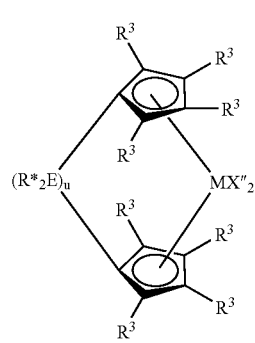

(IV)

wherein:

M is as previously defined, more preferably titanium, zirconium or hafnium, most preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a π-complex with M, whereupon M is in the +2 formal oxidation state, R* independently each occurrence is $C_{1-4}$ alkyl or phenyl, E independently each occurrence is carbon or silicon, and u is an integer from 1 to 8.

Additional examples of suitable metal complexes correspond to the formula:

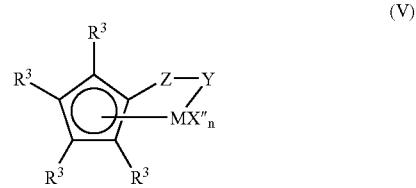

(V)

wherein:

M is as previously defined, more preferably titanium, zirconium or hafnium in the +2, +3, or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, each X" is a halo, hydrocarbyl, hydrocarbyloxy, hydrocarbylamino, or silyl group, said group having up to 20 non-hydrogen atoms, or two X" groups together form a neutral $C_{5-30}$ conjugated diene or a divalent derivative thereof;

Y is —O—, —S—, —NR*—, —PR*—;

Z is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein R* is as previously defined, and n is an integer from 1 to 3.

Most preferred coordination complexes a) used according to the present invention are complexes corresponding to the formula:

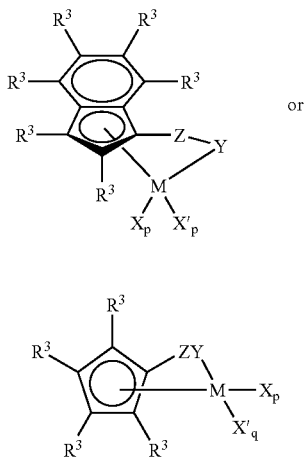

wherein:

R³ independently each occurrence is a group selected from hydrogen, hydrocarbyl, halohydrocarbyl, silyl, germyl and mixtures thereof, said group containing up to 20 non-hydrogen atoms;

M is titanium, zirconium or hafnium;

Z, Y, X and X' are as previously defined;

p is 0, 1 or 2; and q is zero or one;

with the proviso that:

when p is 2, q is zero, M is in the +4 formal oxidation state, and X is an anionic ligand selected from the group consisting of halide, hydrocarbyl, hydrocarbyloxy, di(hydrocarbyl)amido, di(hydrocarbyl)phosphido, hydrocarbylsulfido, and silyl groups, as well as halo-, di(hydrocarbyl)amino-, hydrocarbyloxy- and di(hydrocarbyl)-phosphino-substituted derivatives thereof said X group having up to 20 nonhydrogen atoms, when p is 1, q is zero, M is in the +3 formal oxidation state, and X is a stabilizing anionic ligand group selected from the group consisting of allyl, 2-(N,N-dimethylaminomethyl)phenyl, and 2-(N,N-dimethyl)-aminobenzyl, or M is in the +4 formal oxidation state, and X is a divalent derivative of a conjugated diene, M and X together forming a metallocyclopentene group, and when p is 0, q is 1, M is in the +2 formal oxidation state, and X' is a neutral, conjugated or nonconjugated diene, optionally substituted with one or more hydrocarbyl groups, said X' having up to 40 carbon atoms and forming a π-complex with M.

Additional examples of suitable metal complexes for use in the present invention include Group 4 metal derivatives, especially hafnium derivatives of hydrocarbylamine substituted heteroaryl compounds of the formula R¹HN-T-R² (VI), said complexes corresponding to the formula:

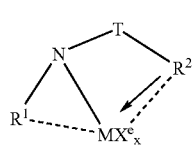

(VIA)

wherein

R¹ is selected from alkyl, cycloalkyl, heteroalkyl, cycloheteroalkyl, aryl, and inertly substituted derivatives thereof containing from 1 to 30 atoms not counting hydrogen;

T is a divalent bridging group of from 1 to 20 atoms other than hydrogen, preferably a mono- or di-$C_{1-20}$ hydrocarbyl substituted methylene or silane group, and R² is a $C_{6-20}$ heteroaryl group containing Lewis base functionality, especially a pyridin-2-yl- or substituted pyridin-2-yl group, and in the metal complex, M is the Group 4 metal, preferably hafnium, $X^e$ is an anionic, neutral or dianionic ligand group, x is a number from 0 to 5 indicating the number of such $X^e$ groups, and bonds, optional bonds and electron donative interactions are represented by lines, dotted lines and arrows respectively.

Preferred complexes are those wherein ligand formation results from hydrogen elimination from the amine group and optionally from the loss of one or more additional groups, especially from R². In addition, electron donation from the Lewis basic, heteroaryl functionality, preferably an electron pair, provides additional stability to the metal center. Preferred examples of the foregoing polyfunctional Lewis base compounds and the resulting metal complexes correspond to the formulas:

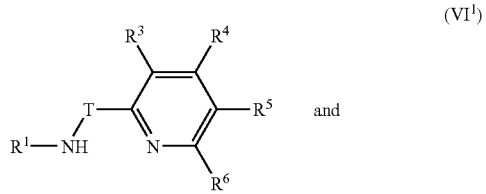

and

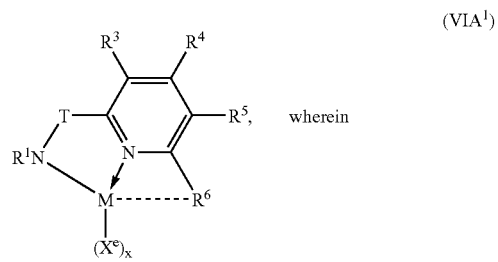

wherein

M, $X^e$, x, R¹ and T are as previously defined,

R³, R⁴, R⁵ and R⁶ are hydrogen, halo, or an alkyl, cycloalkyl, heteroalkyl, heterocycloalkyl, aryl, or silyl group of up to 20 atoms not counting hydrogen, or adjacent R³, R⁴, R⁵ or R⁶ groups may be joined together thereby forming fused ring derivatives, and bonds, optional bonds and electron pair donative interactions are represented by lines, dotted lines and arrows respectively.

More preferred examples of the foregoing difunctional Lewis base compounds and metal complexes correspond to the formula:

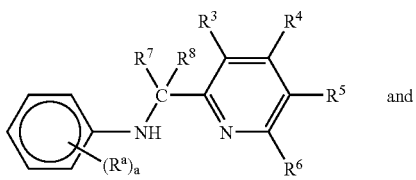

(VI²)

and

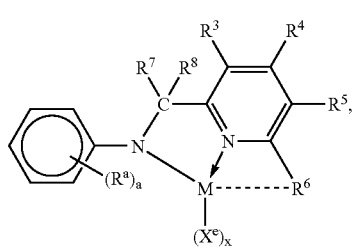

(VIA²)

wherein

M, $X^e$, x, $R^1$ and T are as previously defined, $R^3$, $R^4$, $R^5$ and $R^6$ are as previously defined, preferably $R^3$, $R^4$, and $R^5$ are hydrogen, or $C_{1-4}$ alkyl, and $R^6$ is $C_{6-20}$ aryl, most preferably naphthalenyl;

R independently each occurrence is $C_{1-4}$ alkyl, and a is 1-5, most preferably $R^a$ in two ortho-positions is isopropyl or t-butyl;

$R^7$ and $R^8$ independently each occurrence are hydrogen or a $C_{1-20}$ alkyl or aryl group, most preferably one of $R^7$ and $R^8$ is hydrogen and the other is a $C_{6-20}$ aryl group, especially a fused polycyclic aryl group, most preferably an anthracenyl group, and bonds, optional bonds and electron pair donative interactions are represented by lines, dotted lines and arrows respectively.

Highly preferred polyfunctional Lewis base compounds and metal complexes for use herein correspond to the formula:

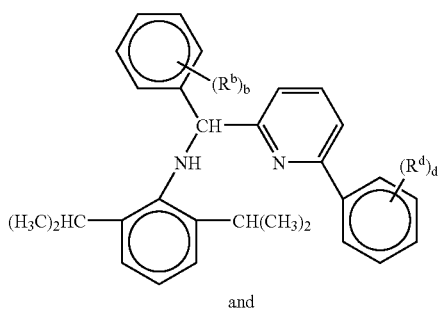

(VI³)

and

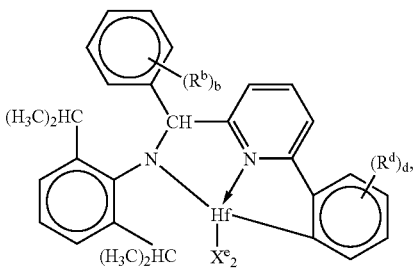

(VIA³)

wherein $X^e$ each occurrence is halide, N,N-dimethylamido, or $C_{1-4}$ alkyl, and preferably each occurrence X is methyl;

$R^b$ independently each occurrence is $C_{1-20}$ alkyl or aryl, or two adjacent $R^b$ groups are joined together thereby forming a ring, and b is 1-5; and $R^d$ independently each occurrence is $C_{1-20}$ alkyl or aryl, or two adjacent $R^d$ groups are joined together thereby forming a ring, and d is 1-5.

Most highly preferred examples of metal complexes for use according to the present invention are complexes of the following formulas:

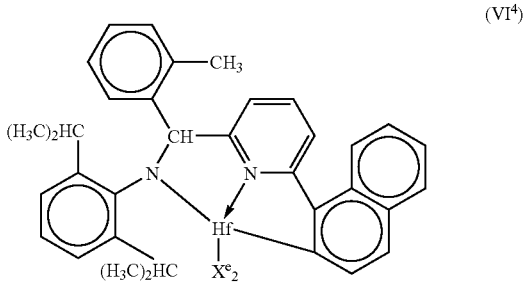

(VI⁴)

and

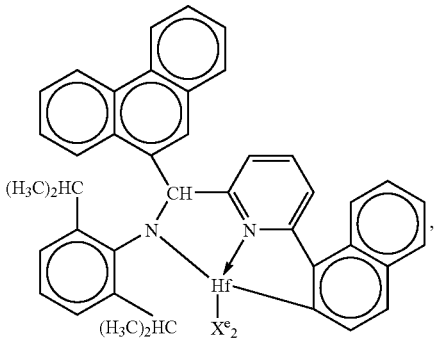

(VIA⁴)

wherein $X^e$ each occurrence is halide, N,N-dimethylamido, or $C_{1-4}$ alkyl, and preferably each occurrence $X^e$ is methyl.

Specific examples of metal complexes (catalysts) usefully employed as component a) according to the present invention include:

bis(cyclopentadienyl)zirconiumdimethyl,
bis(cyclopentadienyl)zirconium dibenzyl,
bis(cyclopentadienyl)zirconium methyl benzyl,
bis(cyclopentadienyl)zirconium methyl phenyl,
bis(cyclopentadienyl)zirconiumdiphenyl,
bis(cyclopentadienyl)titanium-allyl,
bis(cyclopentadienyl)zirconiummethylmethoxide,
bis(cyclopentadienyl)zirconiummethylchloride,
bis(pentamethylcyclopentadienyl)zirconiumdimethyl,
bis(pentamethylcyclopentadienyl)titaniumdimethyl,
bis(indenyl)zirconiumdimethyl,
indenylfluorenylzirconiumdimethyl,
bis(indenyl)zirconiummethyl(2-(dimethylamino)benzyl),
bis(indenyl)zirconiummethyltrimethylsilyl,
bis(tetrahydroindenyl)zirconiummethyltrimethylsilyl,
bis(pentamethylcyclopentadienyl)zirconiummethylbenzyl,
bis(pentamethylcyclopentadienyl)zirconiumdibenzyl,
bis(pentamethylcyclopentadienyl)zirconiummethylmethoxide,
bis(pentamethylcyclopentadienyl)zirconiummethylchloride,
bis(methylethylcyclopentadienyl)zirconiumdimethyl,
bis(butylcyclopentadienyl)zirconiumdibenzyl,
bis(t-butylcyclopentadienyl)zirconiumdimethyl,
bis(ethyltetramethylcyclopentadienyl)zirconiumdimethyl,
bis(methylpropylcyclopentadienyl)zirconiumdibenzyl,
bis(trimethylsilylcyclopentadienyl)zirconiumdibenzyl,
dimethylsilyl-bis(cyclopentadienyl)zirconiumdimethyl,
dimethylsilyl-bis(tetramethylcyclopentadienyl)titanium (III) allyl
dimethylsilyl-bis(t-butylcyclopentadienyl)zirconiumdibenzyl,
dimethylsilyl-bis(n-butylcyclopentadienyl)zirconium bis(trimethylsilyl),
(methylene-bis(tetramethylcyclopentadienyl)titanium(III) 2-(dimethylamino)benzyl,
(methylene-bis(n-butylcyclopentadienyl)titanium(III) 2-(dimethylamino)benzyl,
dimethylsilyl-bis(indenyl)zirconiumbenzylchloride,
dimethylsilyl-bis(2-methylindenyl)zirconiumdimethyl,
dimethylsilyl-bis(2-methyl-4-phenylindenyl)zirconiumdimethyl,
dimethylsilyl-bis(2-methylindenyl)zirconium-1,4-diphenyl-1,3-butadiene,
dimethylsilyl-bis(2-methyl-4-phenylindenyl)zirconium (II) 1,4-diphenyl-1,3-butadiene,
dimethylsilyl-bis(tetrahydroindenyl)zirconium(III) 1,4-diphenyl-1,3-butadiene,
di(isopropylamino)borandiylbis(2-methyl-4-phenylindenyl)zirconium dimethyl,
dimethylsilyl-bis(tetrahydrofluorenyl)zirconium bis(trimethylsilyl),
(isopropylidene)(cyclopentadienyl)(fluorenyl)zirconiumdibenzyl,
dimethylsilyl(tetramethylcyclopentadienyl)(fluorenyl)zirconium dimethyl,
cyclopentadienyltitaniumtrimethyl,
indenyltitaniumtrimethyl,
octahydrofluorenyltitaniumtrimethyl,
tetrahydroindenyltitaniumtrimethyl,
tetrahydrofluorenyltitaniumtrimethyl,
(tert-butylamido)(tetramethyl-$\eta^5$-cyclopentadienyl) dimethylsilanetitanium dibenzyl,
(tert-butylamido)(tetramethyl-$\eta^5$-cyclopentadienyl)dimethylsilanetitanium dimethyl,
(tert-butylamido)(tetramethyl-$\eta^5$-cyclopentadienyl)-1,2-ethanediyltitanium dimethyl,
(tert-butylamido)(tetramethyl-$\eta^5$-indenyl)dimethylsilanetitanium dimethyl,
(tert-butylamido)(tetramethyl-$\eta^5$-cyclopentadienyl)dimethylsilane titanium (III) 2-(dimethylamino)benzyl;
(tert-butylamido)(tetramethyl-$\eta^5$-cyclopentadienyl)dimethylsilanetitanium (III) allyl,
(tert-butylamido)(tetramethyl-$\eta^5$-cyclopentadienyl)dimethylsilanetitanium (III) 2,4imethylpentadienyl,
(tert-butylamido)(tetramethyl-$\eta^5$-cyclopentadienyl)dimethylsilanetitanium (II) 1,4-diphenyl-1,3-butadiene,
(tert-butylamido)(tetramethyl-$\eta^5$-cyclopentadienyl)dimethylsilanetitanium (II) 1,3-pentadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (II) 2,4-hexadiene,
(tert-butylamido)(2-methylindenyl)dimethylsilanetitanium (IV) 2,3-dimethyl-1,3-butadiene,
(tert-butylamido)(2-methylindenyl)dimethylsilanetitanium (II) 1,3-pentadiene,
(tert-butylamido)(2-methylindenyl)dimethylsilanetitanium (IV) 1,3-butadiene,
(tert-butylamido)(2,3-dimethylindenyl)dimethylsilanetitanium (IV) 2,3-dimethyl-1,3-butadiene,
(tert-butylamido)(2,3-dimethylindenyl)dimethylsilanetitanium (IV) isoprene
(tert-butylamido)(2,3-dimethylindenyl)dimethylsilanetitanium (IV) dimethyl
(tert-butylamido)(2,3-dimethylindenyl)dimethylsilanetitanium (IV) dibenzyl
(tert-butylamido)(2,3-dimethylindenyl)dimethylsilanetitanium (IV) 1,3-butadiene,
(tert-butylamido)(2,3-dimethylindenyl)dimethylsilanetitanium (II) 1,3-pentadieine,
(tert-butylamido)(2,3-dimethylindenyl)dimethylsilanetitanium (II) 1,4-diphenyl-1,3-butadiene,
(tert-butylamido)(2-methyl-(s)-indacenyl)dimethylsilanetitanium (II) 1,3-pentadiene,
(tert-butylamido)(2-methyl-(s)-indacenyl)dimethylsilanetitanium (IV) dimethyl,
(tert-butylamido)(2-methyl-(s)-indacenyl)dimethylsilanetitanium (IV) dibenzyl,
(tert-butylamido)(2-methyl-4-phenylindenyl)dimethylsilanetitanium (II) 1,4-diphenyl-1,3-butadiene,
(tert-butylamido)(2-methyl-4-phenylindenyl)dimethylsilanetitanium (II) 1,3-pentadiene,
(tert-butylamido)(2-methyl-4-phenylindenyl)dimethylsilanetitanium (II) 2,4-hexadiene,
(cyclohexylamido)(tetramethyl-$\eta^5$-cyclopentadienyl)dimethylsilanetitanium (IV) dimethyl,
(tert-butylamido)(tetramethyl-$\eta^5$-cyclopentadienyl)dimethylsilanetitanium (IV) 2,3-dimethyl-1,3-butadiene,
(tert-butylamido)(tetramethyl-$\eta^5$-cyclopentadienyl)bis(4-dodecylphenyl)silanetitanium (IV) dimethyl,
(tert-butylamido)(tetramethyl-$\eta^5$-cyclopentadienyl)bis(4-dodecylphenyl)silanetitanium (II) 1,4-diphenyl-1,3-butadiene,
(tert-butylamido)(tetramethyl-$\eta^5$-cyclopentadienyl)bis(4-dodecylphenyl)silanetitanium (II) 1,3-pentadiene,
(tert-butylamido)(3-(N -pyrrolyl)indenyl)dimethylsilanetitanium (IV) 2,3-dimethyl-1,3-butadiene,
(tert-butylamido)(3-(N-pyrrolyl)indenyl)dimethylsilanetitanium (IV) isoprene
(tert-butylamido)(3-(N-pyrrolyl)indenyl)dimethylsilanetitanium (IV) dimethyl
(tert-butylamido)(3-(N-pyrrolyl)indenyl)dimethylsilanetitanium (IV) dibenzyl (tert-butylamido)(3-(N-pyrrolyl)indenyl)dimethylsilanetitanium (IV) 1,3-butadiene,
(tert-butylamido)(3-(N-pyrrolyl)indenyl)dimethylsilanetitanium (II) 1,3-pentadiene,
(tert-butylamido)(3-(N-pyrrolyl)indenyl)dimethylsilanetitanium (II) 1,4-diphenyl-1,3-butadiene,
(tert-butylamido)(3-N-pyrrolidinylinden-1-yl)dimethylsilanetitanium (IV) dimethyl,
[N-(2,6-di(1-methylethyl)phenyl)amido)(o-tolyl)(α-naphthalen-2-diyl(6-pyridin-2-diyl)methane)]hafnium dimethyl,
[N-(2,6-di(1-methylethyl)phenyl)amido)(o-tolyl)(α-naphthalen-2-diyl(6-pyridin-2-diyl)methane)]hafnium di(N,N-dimethylamido),
[N-(2,6-di(1-methylethyl)phenyl)amido)(o-tolyl)(α-naphthalen-2-diyl(6-pyridin-2-diyl)methane)]hafnium dichloride,
[N-(2,6-di(1-methylethyl)phenyl)amido)(phenanthren-5-yl) (α-naphthalen-2diyl(6-pyridin-2-diyl)methane)]hafnium dimethyl,
[N-(2,6-di(1-methylethyl)phenyl)amido)(henanthren-5-yl) (α-naphthalen-2-diyl(6-pyridin-2-diyl)methane)]hafnium di(N,N-dimethylamido), and
[N-(2,6-di(1-methylethyl)phenyl)amido)(phenanthren-5-yl) (α-naphthalen-2-diyl(6-pyridin-2-diyl)methane)]hafnium dichloride.

The foregoing types of catalysts and catalyst compositions are described in, for example, U.S. Pat. Nos. 5,703,187, 5,965,756, 6,150,297, 5,064,802, 5,145,819, 5,149,819, 5,243,001, 5,239,022, 5,276,208, 5,296,434, 5,321,106, 5,329,031, 5,304,614, 5,677,401 and 5,723,398, PCT publications WO 93/08221, WO 93/08199, WO 95/07140, WO 98/11144, WO02/02577, WO 02/38628; and European publications EP-A-578838, EP-A-638595, EP-A-513380 and EP-A-816372.

Additional suitable catalyst compound are complexes of a transition metal, a substituted or unsubstituted π-bonded ligand, and one or more heteroallyl moieties, such as those described in U.S. Pat. Nos. 5,527,752 and 5,747,406, and EP-B-0 735 057. Preferably, these catalyst compounds are represented by one of the following formulas:

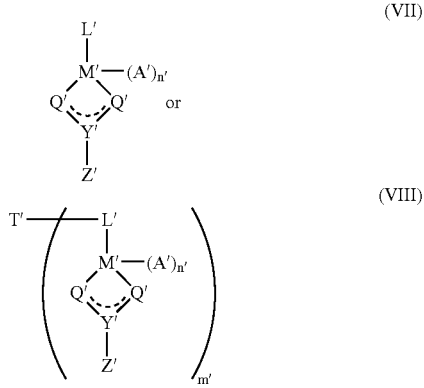

wherein M' is a metal from Groups 4, 5 or 6 of the Periodic Table of the Elements, preferably titanium, zirconium or hafnium, most preferably zirconium or hafnium;

L' is a substituted or unsubstituted, π-bonded ligand coordinated to M' and, when T' is present, bonded to T', preferably L' is a cycloalkadienyl ligand, optionally with one or more hydrocarbyl substituent groups having from 1 to 20 carbon atoms, or fused ring derivatives thereof, for example, a cyclopentadienyl, indenyl or fluorenyl ligand;

each Q' is independently selected from the group consisting of —O—, —NR'—, —CR'$_2$— and —S—, preferably oxygen;

Y' is either C or S, preferably carbon;

Z' is selected from the group consisting of —OR', —NR'$_2$, —CR'$_3$, —SR', —SiR'$_3$, —PR'$_2$, —H, and substituted or unsubstituted aryl groups, with the proviso that when Q is —NR'— then Z is selected from the group consisting of: —OR', —NR'$_2$, —SR', —SiR'$_3$, —PR'$_2$ and —H' preferably Z is selected from the group consisting of —OR', —CR'$_3$ and —NR'$_2$;

n' is 1 or 2, preferably 1;

A' is a univalent anionic group when n is 2 or A' is a divalent anionic group when n is 1, preferably A' is a carbamate, hydroxycarboxylate, or other heteroallyl moiety described by the Q', Y' and Z' combination;

each R' is independently a group containing carbon, silicon, nitrogen, oxygen, and/or phosphorus and one or more R' groups may be also attached to the L' substituent, preferably R' is a hydrocarbon group containing from 1 to 20 carbon atoms, most preferably an alkyl, cycloalkyl, or an aryl group;

T' is a bridging group selected from the group consisting of alkylene and arylene groups containing from 1 to 10 carbon atoms optionally substituted with carbon or heteroatom(s), germanium, silicon and alkyl phosphine; and m' is 2 to 7, preferably 2 to 6, most preferably 2 or 3.

In the foregoing formulas, the supportive substituent formed by Q', Y' and Z' is a uncharged polydentate ligand exerting electronic effects due to its high polarizability, similar to the cyclopentadienyl ligand. In the most referred embodiments of this invention, the disubstituted carbamates and the hydroxycarboxylates are employed. Non-limiting examples of these catalyst compounds include indenyl zirconium tris(diethylcarbamate), indenyl zirconium tris(trimethylacetate), indenyl zirconium tris(p-toluate), indenyl zirconium tris(benzoate), (1-methylindenyl)zirconium tris (trimethylacetate), (2-methylindenyl) zirconium tris (diethylcarbamate), (methylcyclopentadienyl)zirconium tris (trimethylacetate), cyclopentadienyl tris(trimethylacetate), tetrahydroindenyl zirconium tris(trimethylacetate), and (pentamethyl-cyclopentadienyl)zirconium tris(benzoate). Preferred examples are indenyl zirconium tris(diethylcarbamate), indenylzirconium tris(trimethylacetate), and (methylcyclopentadienyl)zirconium tris(trimethylacetate).

In another embodiment of the invention the catalyst compounds are those nitrogen containing heterocyclic ligand complexes, based on bidentate ligands containing pyridine or quinoline moieties, such as those described in WO 96/33202, WO 99/01481, WO 98/42664 and U.S. Pat. No. 5,637,660.

It is within the scope of this invention, in one embodiment, that catalyst compound complexes of $Ni^{2+}$ and $Pd^{2+}$ described in the articles Johnson, et al., "New Pd(II)- and Ni(II)-Based Catalysts for Polymerization of Ethylene and a-Olefins", J.A.C.S, (1995) 117, 6414-6415 and Johnson, et al., "Copolymerization of Ethylene and Propylene with Functionalized Vinyl Monomers by Palladium(II) Catalysts", J.A.C.S., (1996) 118, 267-268, and WO 96/23010, may be combined with a hydroxycarboxylate metal salt for use in the process of invention. These complexes can be either dialkyl ether adducts, or alkylated reaction products of the described dihalide complexes that can be activated to a cationic state by the conventional-type cocatalysts or the activators of this invention described below.

Also included as catalyst compounds are those diimine based ligands for Group 8 to 10 metal compounds disclosed in PCT publications WO 96/23010 and WO 97/48735 and Gibson, et al., *Chem. Comm.* 849-850 (1998).

Other catalysts are those Group 5 and 6 metal imido complexes described in EP-A-0 816 384 and U.S. Pat. No. 5,851,945. In addition, catalysts include bridged bis(arylamido) Group 4 compounds described by D. H. McConville, et al., *Organometallics* (1995) 14, 5478-5480. Other catalysts are described as bis(hydroxy aromatic nitrogen ligands) in U.S. Pat. No. 5,852,146. Other metallocene-type catalysts containing one or more Group 15 atoms include those described in WO 98/46651. Still another metallocene-type catalysts include those multinuclear catalysts as described in WO 99/20665.

It is contemplated in some embodiments, that the catalyst compounds of the invention described above may be asymmetrically substituted in terms of additional substituents or types of substituents, and/or unbalanced in terms of the number of additional substituents on the π-bonded ligand groups. It is also contemplated that the catalysts of the invention may include their structural or optical or enantiomeric isomers (meso and racemic isomers) and mixtures thereof, or they may be chiral and/or a bridged catalyst compounds.

Activator and Activation Methods for the Catalyst Compounds

The above described catalyst compounds for use in the invention are typically activated in various ways to yield catalyst compounds having a vacant coordination site that will coordinate, insert, and polymerize olefin(s).

For the purposes of this patent specification and appended claims, the term "activator" is defined to be any compound or component or method which can activate any of the catalyst compounds of the invention as described above. Non-limiting activators, for example may include a Lewis acid or a non-coordinating ionic activator or ionizing activator or any other compounds including Lewis bases, aluminum alkyls, conventional-type cocatalysts (previously described herein) and combinations thereof that can convert a neutral catalyst compound to a catalytically active cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid recursor or a trisperfluoronaphtyl boron metalloid precursor, polyhalogenated heteroborane anions (WO 98/43983) or combination thereof, that would ionize the neutral catalyst compound.

In one embodiment, an activation method using ionizing ionic compounds not containing an active proton but capable of producing both a catalyst cation and a noncoordinating anion are also contemplated, and are described in EP-A-426637, EP-A-573403 and U.S. Pat. No. 5,387,568.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924, 018, 4,908, 463, 4,968,827, 5,308,815, 5,329,032, 5,248,801, 5,235,081, 5, 157,137, 5,103,031, 5,391,793, 5,391,529, 5,693,838, 5,731,253, 5,731,451 5,744,656; European publications EP-A-561476, EP-A-279586 and EP-A-594218; and PCT publication WO 94/10180.

Ionizing compounds may contain an active proton, or some other cation associated with but not coordinated to or only loosely coordinated to the remaining ion of the ionizing compound. Such compounds are described in European publications EP-A-570982, EP-A-520732, EP-A-495375, EP-A-500944, EP-A-277 003 and EP-A-277004, and U.S. Pat. Nos. 5,153,157, 5,198,401, 5,066,741, 5,206,197, 5,241,025, 5,384,299 and 5,502,124.

Other activators include those described in PCT publication WO 98/07515 such as tris (2,2',2"-nonafluorobiphenyl) fluoroaluminate. Combinations of activators are also contemplated by the invention, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 98/30602 and WO 98/30603 describe the use of lithium (2,2'-bisphenyl-ditrimethylsilicate) as an activator for a catalyst compound. WO 99/18135 describes the use of organoboronaluminum activators. EP-A-781299 describes using a silylium salt in combination with a non-coordinating compatible anion. Also, methods of activation such as using radiation EP-A615981, and electrochemical oxidation, are also contemplated as activating methods for the purposes of rendering the neutral catalyst compound or precursor to a cation capable of polymerizing olefins. Other activators or methods for activating a catalyst compound are described in for example, U.S. Pat. Nos. 5,849,852, 5,859,653, 5,869, 723, and PCT publication WO 98/32775.

Mixed Catalysts

It is also within the scope of this invention that the above described catalyst compounds can be combined with one or more of the catalyst compounds represented by formula (I)-(VIII) with one or more activators or activation methods described above.

It is further contemplated by the invention that other catalysts can be combined with the catalyst compounds of the invention. Examples of such other catalysts are disclosed in U.S. Pat. Nos. 4,937,299, 4,935,474, 5,281,679, 5,359, 015, 5,470,811, 5,719,241, 4,159,965, 4,325,837, 4,701,432, 5,124,418, 5,077,255, 5,183,867, 5,391,660, 5,395,810, 5,691,264, 5,723,399 and 5,767,031; and PCT Publication WO 96/23010.

Method for Supporting

The above described catalyst compounds and catalyst compositions may be combined with one or more support materials or carriers using one of the support methods well known in the art or as described below. In the preferred embodiment, the present invention uses a polymerization catalyst in a supported form. For example, in a most preferred embodiment, the catalyst composition or the individual components thereof are in a supported form, for example deposited on, contacted with, or incorporated within a support or carrier.

The terms "support" or "carrier" are used interchangeably and are any porous or non-porous support material, preferably a porous support material, for example, inorganic oxides, carbides, nitrides, and halides. Other carriers include resinous support materials such as polystyrene, a functionalized or crosslinked organic supports, such as polystyrene divinyl benzene polyolefins or polymeric compounds, or any other organic or inorganic support material, or mixtures thereof.

The preferred carriers are inorganic oxides that include those Group 2, 3, 4, 5, 13 or 14 metal oxides. The preferred supports includes silica, alumina, silica-alumina, silicon carbide, boron nitride, and mixtures thereof. Other useful supports include magnesia, titania, zirconia, and clays. Also, combinations of these support materials may be used, for example, silica-chromium and silica-titania.

It is preferred that the carrier has a surface area in the range of from about 10 to about 700 m²/g, pore volume in the range of from about 0.1 to about 4.0 cc/g and average particle size in the range of from about 10 to about 500 µm More preferably, the surface area of the carrier is in the range of from about 50 to about 500 m²/g, pore volume of from about 0.5 to about 3.5 cc/g, and average particle size of from about 20 to about 200 µm. Most preferably the surface area of the carrier is in the range of from about 100 to about 400 m²/g, pore volume from about 0.8 to about 3.0 cc/g and average particle size is from about 20 to about 100 µm. The average pore size of a carrier of the invention is typically in the range of from about 1 to 100 nm, preferably 5 to 50 nm, and most preferably 7.5 to 35 nm.

Examples of supported catalyst compositions suitably employed in the present invention are described in U.S. Pat. Nos. 4,701,432, 4,808,561, 4,912,075, 4,925,821, 4,937, 217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698, 487, 5,714,424, 5,723,400, 5,723,402, 5,731,261, 5,759,940, 5,767,032 and 5,770,664; and PCT publications WO 95/32995, WO 95/14044, WO 96/06187 and WO 97/02297.

Examples of supporting conventional-type catalyst compositions that may also be employed in the present invention are described in U.S. Pat. Nos. 4,894,424, 4,376,062, 4,395, 359, 4,379,759, 4,405,495 4,540758 and 5,096,869.

It is contemplated that the catalyst compounds of the invention may be deposited on the same or separate supports together with an activator, or the activator may be used in an unsupported form, or may be deposited on a support different from the supported catalyst compounds of the invention, or any combination thereof.

There are various other methods in the art for supporting a polymerization catalyst compound or catalyst compositions suitable for use in the present invention. For example, the catalyst compound of the invention may contain a polymer bound ligand as described in U.S. Pat. Nos. 5,473, 202 and 5,770,755. The catalyst composition of the present invention may be spray dried as described in U.S. Pat. No. 5,648,310. The support used with the catalyst composition of the invention may be functionalized as described in European publication EP-A-802 203. Finally, at least one substituent or leaving group of the catalyst may be selected as described in U.S. Pat. No. 5,688,880.

In a preferred embodiment, the invention provides for a supported catalyst composition that includes a surface modifier as described in PCT publication WO 96/11960.

A preferred method for producing a supported catalyst composition according to the invention is described in PCT publications WO 96/00245 and WO 96/00243. In this preferred method, the catalyst compound and activators are combined in separate liquid. The liquids may be any compatible solvent or other liquid capable of forming a solution or slurry with the catalyst compounds and/or activator. In the most preferred embodiment the liquids are the same linear or cyclic aliphatic or aromatic hydrocarbon, most preferably toluene. The catalyst compound and activator mixtures or solutions are mixed together and added to a porous support or, alternatively, the porous support is added to the respective mixtures. The resulting supported composition may be dried to remove diluent, if desired, or utilized separately or in combination in a polymerization. Highly desirably the total volume of the catalyst compound solution and the activator solution or the mixtures thereof is less than five times the pore volume of the porous support, more preferably less than four times, even more preferably less than three times; with most prefer ranges being from 1.1 times to 3.5 times the pore volume of the support.

Procedures for measuring the total pore volume of a porous support are well known in the art. The preferred procedure is BET nitrogen absorption. Another suitable method well known in the art is described Innes, Total Porosity and Particle Density of Fluid Catalysts By Liquid Titration, *Analytical Chemistry*, (1956) 28, 332-334.

The mole ratio of the activator component to the catalyst compounds suitably is in the range of between 0.3:1 to 2000:1, preferably 1:1 to 800:1, and most preferably 1:1 to 500:1. Where the activator is an ionizing activator such as those based on the anion tetrakis(pentafluorophenyl)boron, the mole ratio of the metal of the activator component to the metal component of the catalyst is preferably in the range of between 0.3:1 to 3:1.

In one embodiment of the invention, one or more olefins, preferably one or more $C_{2-30}$ olefins, preferably ethylene and/or propylene are prepolymerized in the presence of the catalyst composition and/or a conventional-type transition metal catalysts of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921, 825, 5,283,278 and 5,705,578, European publication EP-A-279863, and PCT Publication WO 97/44371. A prepolymerized catalyst composition for purposes of this patent specification and appended claims preferably is a supported catalyst system.

Hydroxycarboxylate Metal Salt

For the purposes of this patent specification and appended claims the term "hydroxycarboxylate metal salt" is any hydroxy-substituted, mono-, di- or tri-carboxylic acid salt wherein the metal portion is a cationic derivative of a metal from Groups 1-13 of the Periodic Table of Elements. Non-limiting examples include saturated, unsaturated, aliphatic, aromatic or saturated cyclic, substituted carboxylic acid salts where the carboxylate ligand has from one to three hydroxy substituents and from 1 to 24 carbon atoms. Examples include hydroxyacetate, hydroxypropionate, hydroxybutyrate, hydroxyvalerate, hydroxypivalate, hydroxycaproate, hydroxycaprylate, hydroxyheptanate, hydroxypelargonate, hydroxyundecanoate, hydroxyoleate, hydroxyoctoate, hydroxyalmitate, hydroxymyristate, hydroxymargarate, hydroxystearate, hydroxyarachate and hydroxytercosanoate. Non-limiting examples of the metal portion includes a metal selected from the group consisting of Al, Mg, Ca, Sr, Sn, Ti, V, Ba, Zn, Cd, Hg, Mn, Fe, Co, Ni, Pd, Li and Na. Preferred metal salts are zinc salts.

In one embodiment, the hydroxycarboxylate metal salt is represented by the following general formula:

, where $M^q$ is a metal from Groups 1 to 16 and the Lanthanide and Actinide series, preferably from Groups 1 to 7 and 12 to 16, more preferably from Groups 3 to 7 and 12 to 14, even more preferably Group 12, and most preferably Zn;

$Q^a$ is halogen, hydrogen, hydroxide, or an alkyl, alkoxy, aryloxy, siloxy, silane, sulfonate or siloxane group of up to 20 atoms not counting hydrogen;

$Q^b$ is a hydrocarbyl radical having from 1 to 50 carbon atoms, preferably 1 to 20 carbon atoms, and optionally substituted with one or more hydroxy, alkoxy, N,N-dihydrocarbylamino, or halo groups, with the proviso that in one occurrence R is substituted with a hydroxy- or N,N-dihydrocarbylamino-group, preferably a hydroxy-group that is coordinated to the metal, M by means of unshared electrons thereof;

q' is an integer from 0 to 3;

q" is an integer from 1 to 4.

In a preferred embodiment $M^q$ is Zn, q' is 0 and q" is 2.

Preferred examples of the foregoing hydroxycarboxylate metal salts include compounds of the formulas:

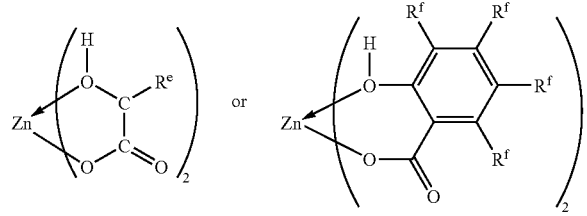

wherein $R^e$ and $R^f$ independently each occurrence are hydrogen, halogen, or $C_{1-6}$ alkyl.

In addition to the foregoing hydroxycarboxylate metal salts, other additives and adjuvants may be incorporated into the catalyst compositions or employed simultaneously in the polymerization reaction for one or more beneficial purposes. Examples of additives that are known in the art include metal salts of fatty acids, such as aluminum, zinc, calcium, titanium or magnesium mono, di- and tri-stearates, octoates, oleates and cyclohexylbutyrates. Examples of such additives include Witco Aluminum Stearate #18, Witco Aluminum Stearate #22, Witco Alumninum Stearate #132 and Witco Aluminum Stearate EA Food Grade, all of which are available from Witco Corporation, Memphis, Tenn., USA. The use of such additives in a catalyst composition is disclosed in U.S. Pat. No. 6,306,984.

Additional suitable additives include antistatic agents such as fatty amines, for example, Kemamine AS 990/2 zinc additive, a blend of ethoxylated stearyl amine and zinc stearate, or Kemamine AS 990/3, a blend of ethoxylated stearyl amine, zinc stearate, and octadecyl-3,5-di-tert-butyl-4-hydroxyhydrocinnamate, also available from Witco Corporation, Memphis, Tenn., USA.

Method of Preparing the Catalyst Composition

The method for making the catalyst composition generally involves the combining, contacting, blending, and/or mixing of the remainder of the catalyst composition with one or more hydroxycarboxylate metal salts. In a preferred embodiment, the catalyst components or a mixture thereof are supported on a carrier.

In another embodiment, the steps of the method of the invention include forming a polymerization catalyst, preferably forming a supported polymerization catalyst, and contacting the polymerization catalyst with at least one hydroxycarboxylate metal salt. In a preferred method, the polymerization catalyst comprises a catalyst compound, an activator or cocatalyst, and a carrier.

The hydroxycarboxylate metal salt is desirably contacted with the catalyst composition or the individual components thereof under inert conditions at a temperature in the range of from 0 to 100° C., more preferably from 15 to 75° C., most preferably at about ambient temperature and pressure. The contacting is desirably performed under an inert gaseous atmosphere, such as nitrogen, however, it is also contemplated that the combination may be performed in the presence of olefin(s), solvents, and hydrogen.

The hydroxycarboxylate metal salt may be added at any stage during the preparation of the polymerization catalyst. Desirably, the catalyst composition and the hydroxycarboxylate metal salt are combined in the presence of a liquid diluent such as mineral oil, toluene, hexane, isobutane or a mixture thereof. In a more preferred method the hydroxycarboxylate metal salt is combined with a catalyst composition that has been formed in a liquid, preferably in a slurry, or combined with a substantially dry or dried, polymerization catalyst composition that has been placed in a liquid and reslurried.

The contact time for the hydroxycarboxylate metal salt and the polymerization catalyst may vary depending on one or more of the conditions, temperature and pressure, the type of mixing apparatus, the quantities of the components to be combined, and even the mechanism for introducing the polymerization catalyst/hydroxycarboxylate metal salt combination into the reactor.

Preferably, the polymerization catalyst, preferably a catalyst compound and a carrier, is contacted with a hydroxycarboxylate metal salt for a period of time from about a second to about 24 hours, preferably from about 1 minute to about 12 hours, more preferably from about 10 minutes to about 10 hours, and most preferably from about 30 minutes to about 8 hours.

The weight ratio of hydroxycarboxylate metal salt to the transition metal compound in the catalyst composition is preferably in the range of from 0.01 to 1000, preferably from 1 to 100, more preferably from 2 to 50, and most preferably in the range of from 4 to 20.

It is believed that the more metal present in the cocatalyst or activator, for example the total aluminum content in trialkylaluminum, alumoxane, or other aluminum containing cocatalysts), the more hydroxycarboxylate metal salt is required for optimal operation.

Mixing techniques and equipment contemplated for use in the method of the invention are well known. Mixing techniques may involve any mechanical mixing means, for example shaking, stirring, tumbling, and rolling. Another technique contemplated involves the use of fluidization, for example in a fluid bed reactor vessel where circulated gases provide the mixing. Non-limiting examples of mixing equipment for combining, in the most preferred embodiment a solid polymerization catalyst and a solid hydroxycarboxylate metal salt, include a ribbon blender, a static mixer, a double cone blender, a drum tumbler, a drum roller, a dehydrator, a fluidized bed, a helical mixer and a conical screw mixer.

Desirably the catalyst composition or the components thereof are tumbled with the hydroxycarboxylate metal salt for a period of time such that a substantial portion of the catalyst or components are intimately mixed and/or substantially contacted with the hydroxycarboxylate metal salt.

Desirably the catalyst composition of the invention is substantially dried and/or free flowing. In a preferred embodiment, the hydroxycarboxylate metal salt or mixture of salts is contacted with a supported catalyst composition in a rotary mixer, tumble mixer, or in a fluidized bed mixing process, under a nitrogen atmosphere, and any liquid diluent is subsequently removed. In another embodiment, the polymerization catalyst and optionally the hydroxycarboxylate metal salt may be contacted with a liquid, such as mineral oil to form a slurry, and introduced to a polymerization reactor as a separate or combined stream.

In the operation of the present invention, it is desirably to employ inert supports having an average particle size ($D_{50}$) from about 10 to 80 μm, preferably from 30 to 50 μm Preferred supports are finely divided silica.

Polymerization Process

Suitable addition polymerization processes for use herein include solution, gas phase, slurry phase, high pressure, or combinations thereof Particularly preferred is a gas phase or slurry phase polymerization of one or more olefins at least one of which is ethylene or propylene. The invention is particularly well suited to the polymerization of ethylene, optionally in combination with propylene, butene-1, pentene-1, 4-methyl-pentene-1, hexene-1, octene-1, or decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbomadiene, isobutylene, vinylbenzocyclobutane, styrenes, alkyl substituted styrene, ethylidene norbornene, isoprene, dicyclopentadiene and cyclopentene.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. Examples of such processes are disclosed in U.S. Pat. Nos. 4,543,399, 4,588,790, 5,028,670, 5,317,036, 5,352,749, 5,405,922, 5,436,304, 5, 453,471, 5,462,999, 5,616,661 and 5,668,228.

The reactor pressure in a gas phase process may vary from about 100 psig (700 kPa) to about 500 psig (3500 kPa), preferably in the range of from about 200 psig (1400 kPa) to about 400 psig (2800 kPa), more preferably in the range of from about 250 psig (1700 kPa) to about 350 psig (2400 kPa).

The reactor temperature in the gas phase process may vary from 30 to 120° C., preferably from 60 to 115° C., more preferably from 70 to 110° C., and most preferably from about 70 to 95° C.

A slurry polymerization process generally uses pressures in the range of from 100 kpa to 5 MPa, and temperatures in the range of 0 to 120° C. In a slurry polymerization, a suspension of solid, particulate polymer is formed in a liquid polymerization diluent to which monomers and often hydrogen along with catalyst are added. The diluent is intermittently or continuously removed from the reactor where the volatile components are separated from the polymer and recycled to the reactor. The liquid diluent employed should remain a liquid under the conditions of polymerization and be relatively inert. Preferred diluents are aliphatic or cycloaliphatic hydrocarbons, preferably propane, n-butane, isobutane, pentane, isopentane, hexane, cyclohexane, or a mixture thereof is employed. Examples of suitable slurry polymerization processes for use herein are disclosed in U.S. Pat. Nos. 3,248,179 and 4,613,484.

Examples of solution processes that are suitably employed with the catalyst compositions of the present invention are described in U.S. Pat. Nos. 4,271,060, 5,001, 205, 5,236,998 and 5,589,555.

In addition to the previously mentioned catalyst compositions, the present polymerization process may utilize small quantities of additives (scavengers) to react with poisons or impurities in the process. Examples of suitable scavengers include triethylaluminum, trimethylaluminum, tri-isobutylaluminum, tri-n-hexylaluminum, diethyl aluminum chloride, and dibutyl zinc. Suitable scavengers and their use in polymerizations is disclosed in U.S. Pat. Nos. 5,712,352 and 5,763,543, and in WO 96/08520.

When starting up a polymerization process, especially a gas phase process, there is a higher tendency for operability problems to occur. Thus, it is contemplated in the present invention that a polymerization catalyst and hydroxycarboxylate metal salt mixture is used on start-up to reduce or eliminate start-up problems. Furthermore, it also contemplated that once the reactor is operating in a stable state, a transition to a catalyst composition lacking in a hydroxycarboxylate metal salt can be made.

In another embodiment, during a polymerization process that is or is about to be disrupted, the catalyst composition may be altered so as to include hydroxycarboxylate metal salt. This switching of polymerization catalysts is contemplated to occur when operability problems arise. Indications of operability problems are well known in the art. Some of which in a gas phase process include temperature excursions in the reactor, unexpected pressure changes, excessive static generation or unusually high static spikes, chunking, and sheeting. Thus, in one embodiment, the hydroxycarboxylate metal salt or a supported derivative thereof may be added directly to the reactor, particularly when operability problems arise.

It has also been discovered that using the polymerization catalyst combined with a hydroxycarboxylate metal salt of the invention it is easier to produce fractional melt index and higher density polymers. In one embodiment, the invention provides for a process for polymerizing olefin(s), especially ethylene or a mixture of ethylene and 1-butene in a reactor in the presence of a the present polymerization catalyst composition to produce a polymer product having a melt index (MI) or (I2) as measured by ASTM-D-1238-E of less than about 1 dg/min and a density greater than 0.920 g/cc, more preferably the polymer product has a melt index less than about 0.75 dg/min and a density greater than 0.925 g/cc.

The polymers produced by the process of the invention can be used in a wide variety of products and end-use applications. The polymers produced by the process of the invention include linear low density polyethylene, elastomers, plastomers, high density polyethylenes, low density olyethylenes, polypropylene, and polypropylene copolymers.

The polymers, typically ethylene based polymers, preferably have a density in the range of from 0.86 g/cc to 0.97 g/cc, preferably in the range of from 0. 88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0. 920 g/cc, and most preferably greater than 0.925 g/cc.

The polymers produced by the process of the invention typically have a molecular weight distribution, a weight average molecular weight to number average molecular weight (Mw/Mn) of greater than 1.5 to about 15, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Desirably the polymers have CDBI's generally in the range of greater than 50 to 99 percent, preferably in the range of 55 to 85 percent, and more preferably 60 to 80 percent. A suitable method for determining the CDBI of a copolymer is disclosed in WO 93/03093.

The invention is further illustrated by the following Examples that should not be regarded as limiting of the present invention. Unless stated to the contrary or conventional in the art, all parts and percents are based on weight.

EXAMPLES 1-4 AND COMPARATIVE A AND B

A. Support Preparation

Support 1: Silica (Davison 948™, available from Grace Davison Company) which had been heated at 600° C. for 3 hours under a nitrogen purge (949 g) was added to toluene (2400 g) containing methylalumoxane (MAO, Akzo Nobel, Inc. 1314 mL of a 13.7 percent toluene solution). The mixture was stirred for 30 minutes, and the temperature of the mixture was increased to 70° C. and the volatiles were removed in vacuo. The resulting dry powder was heated an additional 1 hour under vacuum. The resulting alumoxane modified silica, was a free flowing white solid having an aluminum content of 4.5 mmol/g.

Support 2 Silica (Davison 948™) having $D_{50}$=40 µm and surface area=400 m$^2$/g, was heated for several hours under a $N_2$ stream at 500° C. After cooling under $N_2$, the silica was transferred to a mix tank equipped with a helical stirrer and slurried in isopentane. The remaining surface hydroxyl groups were passivated by treatment with hexane solution of triethylaluminum (TEAL) in an amount to provide 1.65 mmol triethylaluminum/g silica (1.5:1 Al:OH). After washing and drying, a white free-flowing powder was obtained.

B. Supported Catalyst Preparation

1) Dimethylsilyl bis(2-methyl-4-phenylinden-1-yl)zirconium (II) 1,4-diphenylbutadiene, was added as a toluene solution to a slurry of Support 1 to provide 21 µmol Zr/g silica. After washing with isopentane and drying, a red-purple free-flowing powder was obtained.

2) A toluene solution of di($C_{16-20}$alkyl)methylammonium tris(pentafluorophenyl)(p-hydroxyphenyl)borate was treated with 1.0-1.5 molar equivalents of triethylaluminum. This solution was then added to previously dried Support 2 and agitated until free flowing. Isopentane was then added to precipitate the borate and the supernatant was removed. The silica was re-slurried in isopentane and treated with a toluene solution of the metallocene dimethylsilyl bis(2-methyl4-phenylinden-1-yl)zirconium (II) 1,4-diphenylbutadiene. The amounts of borate, metallocene, and silica added gave Zr:B=1.0-1.5 and Zr:SiO$_2$=10 mmol/g. After washing with isopentane and drying, a blue-green free-flowing powder was obtained.

C. Final Catalyst Preparation

Example 1

A mixture of 500 mg of Supported Catalyst 1 (10.5 µmol Zr) was stirred in hexane and 14.5 mg (25.8 µmol) of zinc 3,5-di-tert-butylsalicylate [Zn(O$_2$CC$_6$H$_2$($^t$Bu)$_2$(OH)]$_2$; was added as a solid. After mixing, the slurry was collected, washed with hexane and dried.

Example 2

A mixture of 500 mg of Supported Catalyst 1 (10.5 µmol Zr) was stirred in hexane and 3.2 mg (25.8 µmol) of Zinc di(2-hydroxypropionate) [D/L-lactic acid, hemizinc salt] was added as a solid. After mixing, the slurry was collected, washed with hexane and dried.

Example 3

A mixture of 500 mg of Supported Catalyst 1 (10.5 µmol Zr) was stirred in hexane and 6.3 mg (51.5 µmol) of Zinc di(2-hydroxypropionate) [D/L-lactic acid, hemizinc salt] was added as a solid. After mixing, the slurry was collected, washed with hexane and dried.

Example 4

A mixture of 825 mg of Supported Catalyst 2 (8.3 µmol Zr) was stirred in hexane and 3.1 mg (25.4 µmol) of Zinc 3,5-ti-tert-butylsaficylate [Zn(O$_2$CC$_6$H$_2$($^t$Bu)$_2$(OH)]$_2$] was added as a solid. After mixing, the slurry was collected, washed with hexane and dried.

Comparative Example (A)

This material was prepared by subjecting Supported Catalyst 1 to the same stirring, washing, and isolation procedures as Examples 14, but without the addition of a zinc compound.

Comparative Example (B)

This material was prepared by subjecting Supported Catalyst 2 to the same stirring, washing, and isolation procedures as Examples 1-4, but without the addition of a zinc compound.

Polymerization

Polymerizations were conducted in a computer controlled, stirred, jacketed 1.8 L stainless steel autoclave batch reactor. The bottom of the reactor is fitted with a large orifice bottom dump valve, which empties the reactor contents into a 6-L SS dump pot. The dump pot is vented to a 30 gal. blowdown tank, with both the pot and the tank $N_2$ purged. All chemicals used for polymerization or catalyst makeup are run through purification columns, to remove any impurities. Propylene, toluene, ethylene and mixed alkanes solvent (Isopar E™ available from Exxon Mobil Chemicals Inc.) are passed through 2 columns, the first containing alumina, the second containing a purifying reactant (Q5™ available from Englehardt Corporation). The $N_2$ and $H_2$ are passed through a single column containing Q5™ reactant.

The autoclave was cooled to <40° C. before loading. It was charged with hydrogen, (using a calibrated 52 mL shot tank; differential pressure in the shot tank=0.3 MPa), followed by 500 g of propylene using a micro-motion flowmeter. The reactor was brought to 60° C. and a total pressure of 2.5 MPa The catalyst was slurried in hexane and injected into a shot tank using a 50 mL syringe (loaded and sealed within a glovebox). The shot tank was pressurized with $N_2$ to >0.6 MPa above the reactor pressure, and the contents were quickly blown into the reactor. Both reaction exotherm and pressure drop were monitored throughout the reaction run time.

The agitator was stopped, the reactor was pressured up to about 3.4 MPa with $N_2$, and the bottom dump valve opened to empty reactor contents to the dump pot. Immediately after the run, a 140° C. wash with 600 g of mixed alkanes was performed to remove remaining polymer which was adhered to the reactor walls. When loading for the wash, ½ the solvent was loaded through the catalyst shot tank, so it was completely flushed of residual catalyst, activator and silica. If a wash contained residual polymer, an additional 140° C. wash was performed until the drained washings were clear. The dump pot contents (for the runs and washes) were poured into trays and placed in a lab hood where the solvent was evaporated overnight. The trays were then transferred to a vacuum oven, where they were heated to 145° C. under vacuum to remove any remaining solvent. After the trays cooled to ambient temperature, the polymers were quantified and analyzed.

Results are contained in Table 1.

TABLE 1

| Run | Catalyst | Modifier | Support | Molar Loading (modifer:Zr) | Efficiency (g poly./g Zr) | Percent Fouling |
|---|---|---|---|---|---|---|
| 1 | Ex. 1 | $Zn[O_2CC_6H_2(^tBu)_2(OH)]_2$ | 1 | 2.5 | 138,122 | 20 |
| 2 | Ex. 2 | $Zn[O_2CCHMe(OH)]_2$ | 1 | 2.5 | 318,766 | 16 |
| 3 | Ex. 3 | $Zn[O_2CCHMe(OH)]_2$ | 1 | 4.9 | 466,105 | 21 |
| A* | Comp. A | None | 1 | NA | 245,111 | 29 |
| 4 | Ex. 4 | $Zn[O_2CCHMe(OH)]_2$ | 2 | 3.1 | 447,251 | 30 |
| B* | Comp. B | None | 2 | NA | 407,787 | 48 |

*Comparative, not an example of the invention

As may be seen by examination of the above polymerization results, use of the additives according to the invention generally resulted in less reactor fouling while maintaining or improving polymerization efficiency.

The invention claimed is:

1. A catalyst composition comprising:

a catalyst compound selected from the group consisting of Group 4 metal complexes containing one or more ligands that are π-bonded to the transition metal, and metal complexes of the formula,

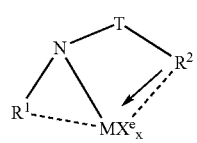

wherein $R^1$ is selected from alkyl, cycloalkyl, heteroalkyl, cycloheteroalkyl, aryl, and inertly substituted derivatives thereof containing from 1 to 30 atoms not counting hydrogen, T is a divalent bridging group of from 1 to 20 atoms not counting hydrogen, $R^2$ is a $C_{6-20}$ heteroaryl group containing Lewis base functionality, M is the Group 4 metal, $X^e$ is an anionic, neutral or dianionic ligand group, x is a number from 0 to 5 indicating the number of such $X^e$ groups, and bonds, optional bonds and electron donative interactions are represented by lines, dotted lines and arrows respectively; and an activator capable of converting said catalyst compound into an active catalyst for addition polymerization;

optionally a carrier;

optionally a liquid diluent, and a hydroxycarboxylate metal salt additive corresponding to the formula:

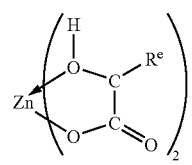

wherein $R^e$ and $R^f$ independently each occurrence are hydrogen, halogen, or $C_{1-6}$ alkyl.

2. A catalyst composition according to claim 1 wherein the catalyst compound is a π-bonded Group 4 metallocene.

3. An olefin polymerization process wherein one or more olefin monomers are polymerized in the presence of a catalyst composition characterized in that the catalyst composition corresponds to any one of claims 1 or 2.

* * * * *

UNITED STATES PATENT AND TRADEMARK OFFICE
CERTIFICATE OF CORRECTION

PATENT NO. : 7,365,039 B2 Page 1 of 1
APPLICATION NO. : 10/544278
DATED : April 29, 2008
INVENTOR(S) : Joseph N. Coalter et al.

It is certified that error appears in the above-identified patent and that said Letters Patent is hereby corrected as shown below:

Page 30, Claim 1, lines 57 through 58 should now read as follows: "...<u>wherein $R^e$ is hydrogen, halogen, or $C_{1-6}$ alkyl</u>."

Signed and Sealed this
Nineteenth Day of July, 2011

David J. Kappos
*Director of the United States Patent and Trademark Office*